No. 843,352.

PATENTED FEB. 5, 1907.

L. McCARTHY.
PROCESS OF MAKING INSULATORS.
APPLICATION FILED MAR. 8, 1906.

Witnesses:
J. Henry Parker
Aluie Tarr

Inventor:
Louis McCarthy
by Macleod, Calver, Copeland & Dike.
Attorneys

THE NORRIS PETERS CO., WASHINGTON, D. C.

UNITED STATES PATENT OFFICE.

LOUIS McCARTHY, OF BOSTON, MASSACHUSETTS.

PROCESS OF MAKING INSULATORS.

No. 843,352.  Specification of Letters Patent.  Patented Feb. 5, 1907.

Application filed March 8, 1906. Serial No. 304,828.

*To all whom it may concern:*

Be it known that I, LOUIS MCCARTHY, a citizen of the United States, residing at Boston, county of Suffolk, Commonwealth of Massachusetts, have invented a certain new and useful Improvement in Processes of Making Insulators, of which the following is a specification, reference being had therein to the accompanying drawings.

My invention has to do with the manufacture of insulating-couplings of the kind which are used to insulate from each other the proximate sections of pipe, so that in the case, for example, of water-pipes which enter and supply a building from a main in the street the portion of said pipes within the building may be insulated from the portion outside. These insulators are provided with an interior lining of insulating material which is compressed to form the inner wall of the pipe-coupling for a portion of its length. This insulating material may be located in a recess in the metallic portions of the pipe-couplings or it may form a ring which projects into the interior of the pipe-coupling. The insulating material forming this inner ring or band is put in place while in a plastic state and is then subjected to pressure and dried or hardened, so that it becomes solidified and fixed in place. It is desirable in the manufacture of insulators of this kind that the insulation be subjected to very considerable pressure to insure that it fills the interstices of the coupling and to properly set or harden it.

My invention has for its object to provide a new and improved method for forming the plastic insulating material into a band or ring of the proper shape and is equally applicable to insulating-couplings having the insulating-ring in a recess or having the insulating-ring projecting into the interior of the pipe-coupling.

The invention will be fully understood from the following description, taken in connection with the accompanying drawings, and the novel features are pointed out and clearly defined in the claims at the close of the specification.

Figure 1:
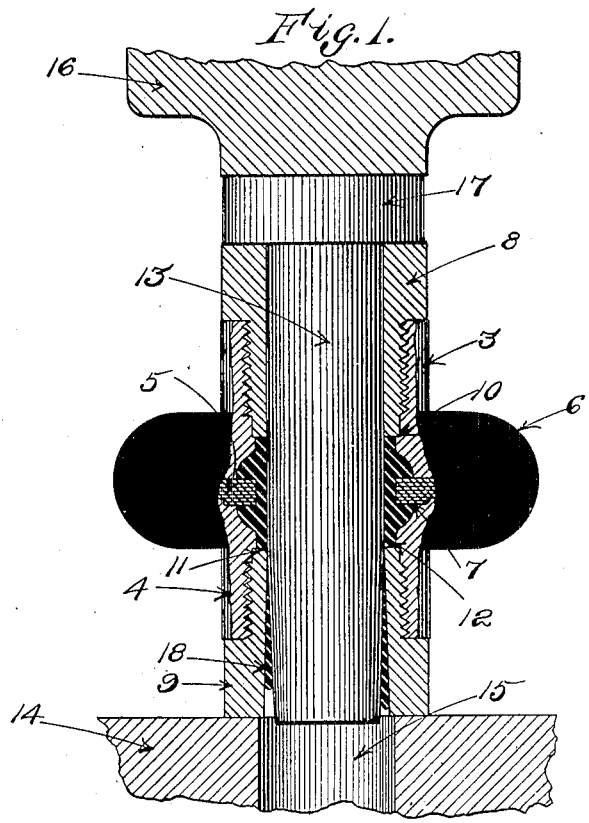
Figure 2:
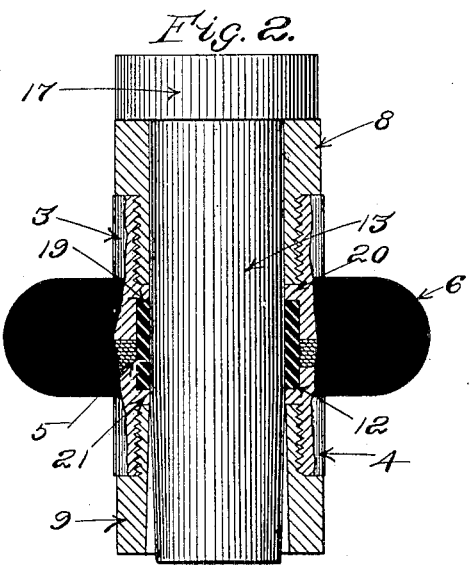

Referring to the drawings, Figure 1 shows the method of forming the interior band of insulation in a pipe-coupling of the form in which the ring of insulating material projects into the interior of the pipe-coupling. Fig. 2 shows the method of forming the interior insulating-band in a recessed coupling.

Referring now to the drawings, and more particularly to Fig. 1 thereof, at 3 and 4 are shown the two metallic coupling members, separated by a layer of insulation 5 and having their flanges (not shown in the drawings) covered with an exterior layer of insulation 6. These parts are of ordinary construction, and the layer of insulation 6 may be applied before or after the insertion of the interior lining of insulation by my process, as is most convenient. The insulating-coupling is made up into the condition shown in Fig. 1, it being with or without the exterior covering 6, as is most convenient before the interior insulating-lining is applied. The separating layer 5, which may be preferably of sheet-mica or other suitable insulation, is shown as projecting slightly into an annular recess 7. The workman first screws into each end of the pipe-coupling suitable collars 8 and 9, which form shoulders 10 and 11, which serve to confine and shape the interior band of insulation. The workman then takes the insulating-coupling and inserts manually sufficient insulating material in a plastic state or condition to form the desired insulating-ring. This plastic material is shown at 12. This insulating material may be made plastic by heat, in which case I find it desirable to have both the insulating-coupling and the mandrel heated, in order that the insulating material may not be cooled and hardened before it is subjected to pressure. The workman then inserts in the upper collar 8 a mandrel 13, having a very slight taper at its lower end and having a diameter for the remainder of its length equal to the desired diameter of the interior of the finished insulating-ring. The workman then places the insulator and mandrel on the lower die 14 of a press, this lower die being provided with a hole 15 to receive the lower end of the mandrel and also to receive any excess of insulating material. The upper die 16, coming in contact with the head 17 of the mandrel 13, forces the mandrel down through the insulating-coupling and the tapered portion thereof drives the insulating material 12 into the annular recess formed between the two collars 8 and 9 and the interior of the coupling members 3 and 4. By forming the mandrel with a very long taper I am enabled to exert a heavy uniform pressure upon the insulating material, and thus solidify the same. The excess of insulating material is carried out by the tapered portion of the mandrel, as shown at 18. The coupling, with the mandrel in it, may then be allowed to stand in the press for a few minutes while the insulating material is hardening and cooling, if insulating material which is plastic under heat is used. The mandrel 13 is then removed and the two collars 8 and 9 are unscrewed, after which any waste insulating material may be broken away, when it will be found that a perfectly-formed ring of compressed and hardened insulating material has been formed on the interior of the insulating-coupling.

Referring now to Fig. 2, there is there shown an insulating-coupling having formed therein an annular recess 19 by two shoulders 20 and 21, formed directly upon the two coupling members. In this case the collars 8 and 9 are employed as bearings for the mandrel 13; but the ring of insulation is formed between the shoulders 20 and 21. The process of forming this kind of an insulator is, however, exactly the same, the insulation being compressed into the recess by means of the tapered mandrel.

What I claim is—

The improved process of forming an interior layer of insulation in a coupling which consists in inserting a collar in each end of the coupling to form a shoulder on the insulation, manually inserting the insulating material in a plastic state and subjecting the same to pressure by means of a tapered mandrel.

In testimony whereof I affix my signature in presence of two witnesses.

LOUIS McCARTHY.

Witnesses:
GEORGE P. DIKE,
J. HENRY PARKER.